United States Patent
Mardiks

(10) Patent No.: US 8,484,720 B2
(45) Date of Patent: Jul. 9, 2013

(54) SERVICE BINDING METHOD AND SYSTEM

(75) Inventor: Eitan Mardiks, Raanana (IL)

(73) Assignee: SanDisk IL Ltd., Kfar Saba (IL)

(*) Notice: Subject to any disclaimer, the term of this patent is extended or adjusted under 35 U.S.C. 154(b) by 597 days.

(21) Appl. No.: 12/471,152

(22) Filed: May 22, 2009

(65) Prior Publication Data

US 2010/0299744 A1    Nov. 25, 2010

(51) Int. Cl.
*G06F 21/00* (2006.01)

(52) U.S. Cl.
USPC .......... 726/17; 380/270; 726/26; 726/27; 713/193

(58) Field of Classification Search
USPC ............ 380/270; 713/193; 726/26, 17, 27
See application file for complete search history.

(56) References Cited

U.S. PATENT DOCUMENTS

| | | | |
|---|---|---|---|
| 2005/0108571 A1 | 5/2005 | Lu et al. | |
| 2007/0078917 A1 | 4/2007 | Edrey | |
| 2007/0142086 A1* | 6/2007 | Boursier et al. | 455/558 |
| 2007/0218945 A1 | 9/2007 | Agami et al. | |

FOREIGN PATENT DOCUMENTS

| | | |
|---|---|---|
| EP | 1 280 149 A2 | 1/2003 |
| EP | 1 548 667 A1 | 6/2005 |
| EP | 1 610 223 A2 | 12/2005 |
| EP | 1 837 790 A1 | 9/2007 |
| EP | 1837790 A1 * | 9/2007 |

OTHER PUBLICATIONS

International Search Report issued in international application No. PCT/IB2010/001162, mailed Sep. 15, 2010, 7 pages.
Written Opinion issued in international application No. PCT/IB2010/001162, mailed Sep. 15, 2010, 8 pages.
International Preliminary Report on Patentability issued in international application No. PCT/IB2010/001162, mailed Dec. 1, 2011 (9 pages).

* cited by examiner

*Primary Examiner* — Philip Chea
*Assistant Examiner* — Kendall Dolly
(74) *Attorney, Agent, or Firm* — Brinks Hofer Gilson & Lione

(57) ABSTRACT

A method and system of binding content is disclosed. A non-volatile storage device creates a secure communication channel with a service provider system via a host device, and obtains a content access authorization. The host device facilitates the establishment of the secure communication channel. A removable device in communication with the host is bypassed when establishing the secure communication channel. The authorization may be based on identification information transmitted by the non-volatile storage device to the service provider system over the secure communication channel. The identification information may identify the non-volatile storage device, the host device, or the subscriber to the service provider system. The service provider system, in turn, may use the identification information to determine the type of authorization (if any) to send to the non-volatile storage device. The non-volatile storage device processes requests received from the host device to access the content according to the received authorization.

14 Claims, 3 Drawing Sheets

SERVICE BINDING METHOD AND SYSTEM

TECHNICAL FIELD

This application relates generally to the operation of non-volatile flash memory systems, and, more specifically, to a method and system for content binding.

BACKGROUND

The ever-increasing capacity of small form factor memory cards allows for new possibilities in distributing digital content. One such development is to distribute memory cards pre-loaded with digital content, such as music, pictures, video, or books. The distribution of digital media content on memory cards presents a variety of challenges. The owner or the provider of such digital content may wish to limit copying, uploading, or downloading of the digital content to other devices. Further, the content provider may prefer to restrict access to the content to a limited number of hardware devices, sometimes referred to as binding content to those devices.

Content management schemes may address these and other content distribution requirements of digital content providers. Some content management schemes may require a specialized application running on the host device in order to access the content, and implement content binding or otherwise regulate access to the content in accordance with the content management scheme. However, such specialized applications may not be installed on all hosts, thus preventing those hosts from accessing the content. Further, some hosts may be incapable of running a specialized content management application because of limitations on storage space or processing capability. Further, a content provider may have to provide the separate specialized applications for a variety of personal computer, PDA, and cellular telephone platforms, which increases the overall cost of distributing content.

SUMMARY

Therefore, it would be advantageous to have method or system where digital content management may be achieved with limited use of specialized content applications running on the host device. By eliminating the need for specialized content access applications, a consumer may be able to access media on a storage device such as a memory card using an increased number of host devices.

In order to address these issues, when a non-volatile storage device is powered by or comes into communication with a host device, the non-volatile storage device may create a secure communication channel with a service provider system via the host device. The host device facilitates the establishment of the secure communication channel. A removable device in communication with the host is bypassed when establishing the secure communication channel. Once the secure communication channel is established, the non-volatile storage device transmits an authorization request to the service provider system over the secure communication channel. The authorization request may contain identification information such as the identity of the non-volatile storage device, the host device, or the subscriber, customer, or user. The service provider system, in turn, may use the identification information to determine the type of authorization (if any) to send to the non-volatile storage device. Content is bound to a user, customer, subscriber, or host device when authorization to access content may depend on the identity of the user, customer, subscriber, or host device attempting to access the content.

In response to the authorization request, the service provider system may transmit an authorization from the service provider system over the secure communication channel. The non-volatile storage device may utilize the received authorization when processing access requests from the host device. Specifically, the non-volatile storage device may utilize the authorization in order to determine whether to grant or deny a content access request from the host device.

In one embodiment, a Mobile Network Operator (MNO) may limit the access to content stored on a memory card provided or sold to a user at subsidized price. Content access is limited single user or set of users subscribed to the specific MNO. Binding the content to the user is performed by the memory card communicating directly with an MNO server, without the need for a specialized application installed on the user's cellular telephone, to obtain authorizations to apply when processing requests to access the content. Specifically, binding content by direct communication between the memory card and the MNO eliminates the need for a specialized application that binds content to a handset SIM card.

Other embodiments and features and advantages thereof are possible and will be, or will become, apparent to one with skill in the art upon examination of the following detailed description and accompanying drawings. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

A method and system for controlling access to protected content with limited use of specialized host device software or applications is explained in further detail in the exemplary embodiments discussed in the foregoing figures and accompanying description.

Figure 1:
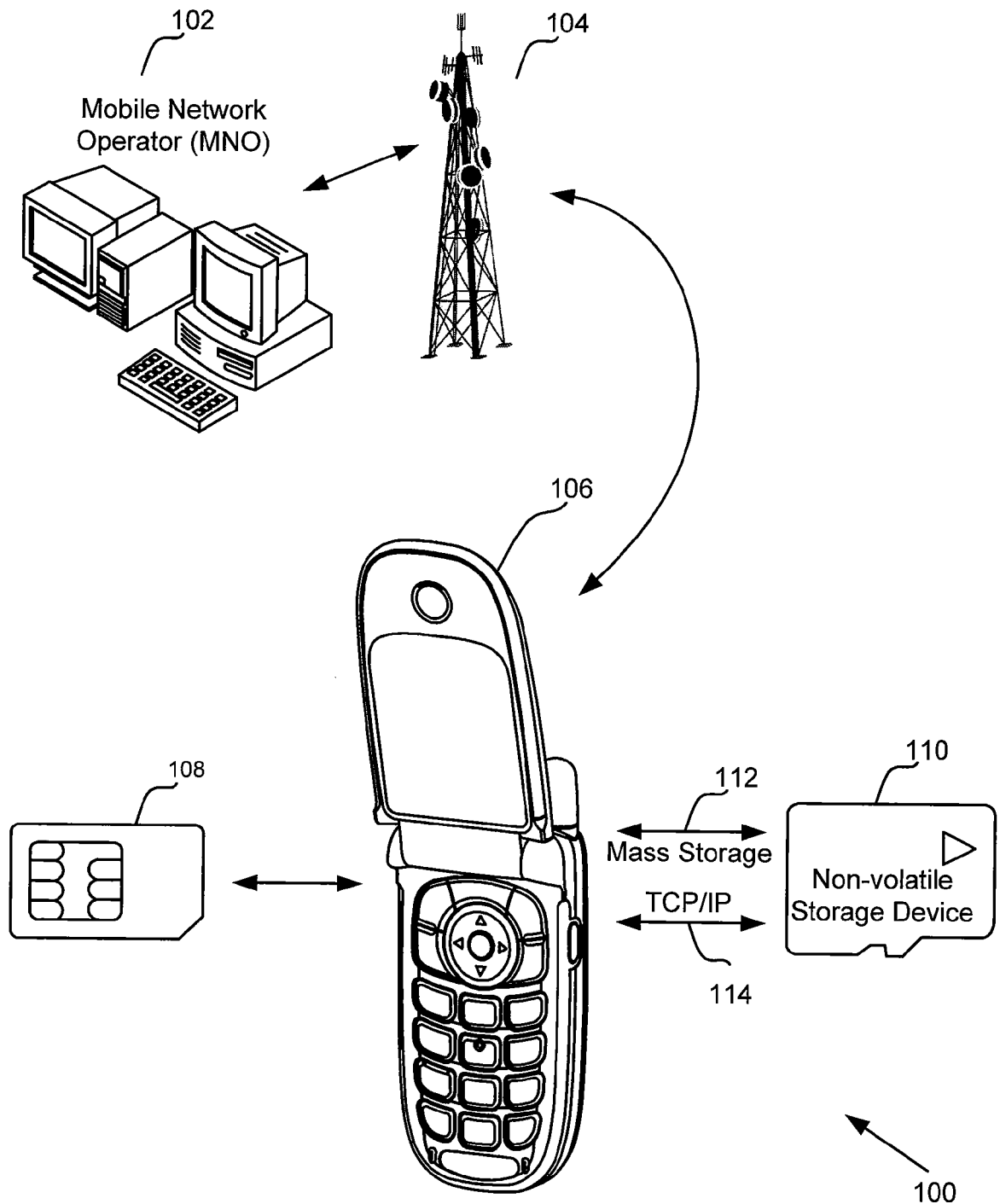
FIG. 1 is a diagram illustrating an exemplary system for controlling access to content on a non-volatile storage device.

FIG. 1 is a diagram illustrating an exemplary system for controlling access to content on a non-volatile storage device. The system 100 includes a Mobile Network Operator (MNO) 102, a plurality of cellular telephone antennas 104, a cellular telephone 106, a SIM (for Global System for Mobile communication networks) or an R-UIM (for Code Division Multiple Access networks) card 108, and a non-volatile storage device 110. A host device such as a cellular telephone 106 may also store and access content stored in a non-volatile storage device 110. The non-volatile storage device 110 may employ flash EEPROM (Electrically Erasable and Programmable Read Only Memory) cells formed on one or more integrated circuit devices. In one embodiment, the non-volatile storage device 110 may be a commercially available small form factor removable media card, such as a CompactFlash (CF) card, a MultiMedia card (MMC), a Secure Digital (SD)

card, a micro Secure Digital (micro SD) card or a personnel tag (P-Tag) device. While the host device shown in FIG. 1 is a cellular telephone 106, many types of host devices may access the non-volatile storage device 110, including personal computers, notebook computers, personal digital assistants (PDAs), various data communication devices, digital cameras, cellular telephones, portable audio players, automobile sound systems, and similar types of equipment.

An MNO 102 may transmit instructions to and receive and data from a cellular telephone 106 by transmitting commands, and transmitting and receiving data, through a network of antennas 104 in communication with a cellular telephone 106. A host device such as a cellular telephone 106 in communication with a mobile network such as Global System for Mobile communication (GSM) or Code Division Multiple Access (CDMA) networks, contains a SIM or R-UIM card 108, respectively, that stores one more values that uniquely identify the subscriber or a subscriber's cellular telephone 106. Values that may identify a subscriber include an International Mobile Subscriber Identity (IMSI) value; another is a Mobile Subscriber Integrated Services Digital Network (MSISDN) value. Yet another value that may identify a subscriber is the International Mobile Equipment Identity (IMEI) value, which is a unique identification value stored in GSM-capable cellular telephones.

The card 108, such as a SIM or R-UIM card, may also contain additional secure storage for other variables or parameters defined by the MNO 102. The MNO 102 can read or write to this storage, and configure this storage to allow read-only access to these variables by other entities, such as cellular telephone 106 software applications or hardware. In addition to providing secure non-volatile storage for parameters defined by the MNO 102, the SIM or R-UIM card 108 typically contains a microcontroller that executes programs (such as applets) that are also defined by the MNO 102 and stored within the SIM or R-UIM card 108.

The cellular telephone 106 may communicate with the non-volatile memory device 110 using a mass storage interface 112, or a Transmission Control Protocol/Internet Protocol (TCP/IP) interface 114. The non-volatile memory device 110 may also initiate communication with other devices, such as a service provider system like the Mobile Network Operator 102, utilizing the TCP/IP interface 114 in communication with a server via a network.

In one embodiment, some of the content stored on the card is loaded by the manufacturer or distributor of the device. In another embodiment, content is transmitted by the MNO 102 over the cellular telephone network 104, and stored in the non-volatile memory card 110 by the cellular telephone 106. Such content received over the network 104 may be received from the MNO 102 in response to a request from the cellular telephone 106. Alternatively, the MNO 102 may initiate the transmission of content to the cellular telephone 106 for storage in the non-volatile storage device 110. One example of "pushing" content to a consumer is when an MNO 102 sends programming, weather reports, news, or other content to the cellular telephone 106, such as on a periodic basis for local storage in the non-volatile storage device 110, where a user of the cellular telephone 106 may optionally access, view, read, or listen to the locally stored content at a later time.

A content provider may wish to limit access to the content pre-loaded on or downloaded to a non-volatile storage device 110. In one example, a content provider may permit content to be accessed on a single device, such as a cellular telephone identified through an IMEI value, or by single subscriber or customer, identified by information such as a user name, telephone number, network address, or by an MSISDN value.

A content provider may advantageously charge less for a license to content accessible to a limited number of devices or users.

One approach to controlling access in this manner is to bind or associate content with a particular hardware device or user, subscriber, or customer. Content may be distributed in an "unbound" state. Once accessed by a particular device, device type, or user, the content may be bound to that device, device type, or user, such that access to the content by other users, devices, or types of devices may be prohibited.

In another embodiment, the content may be bound to a finite number of users or devices. For example, a user may first access the content on a cellular telephone, a PDA, and two personal computers. After four devices are used to access the content, access to the content using a fifth device is prohibited. The content may be only accessed by the first four devices that access it, and thus the content is bound to those four devices. In yet another embodiment, once bound, access to the content by additional users or devices may be purchased from a content provider, to allow binding to additional users or devices.

In another embodiment, to limit the number of SKUs (stock keeping units) of memory cards pre-loaded with content, a content provider may distribute a memory card pre-loaded with a variety of digital content, where a typical consumer may only wish to access a subset of the total digital content preloaded onto the memory card. In this case, the card user may be permitted access to a subset of the content for a fixed price (such as the purchase price of the memory card), and may access additional pre-loaded content by paying additional funds to the content provider or another third party, or by subscribing to a service or performing another action.

Some cellular telephone systems perform binding through the use of an application on the host device 106 that binds the content with the IMSI value stored on the SIM card 108. In this approach, the content stored in the non-volatile storage device 110 is only accessible if the non-volatile storage device 110 is in communication with a host device 106 that provides the correct IMSI value (or a value derived from the IMSI value, such as a credential or hash value) to the non-volatile storage device 110. This approach requires a specialized host device application to read an IMSI value from or calculate a credential based upon the IMSI value stored in the SIM card 108 installed in the host device 106, request an authorization from the non-volatile storage device 110 using the IMSI value or credential, and receive an authorization. If the host device 106 does not have this specialized host device application installed, the content on the non-volatile storage device 110 is inaccessible.

Figure 2:
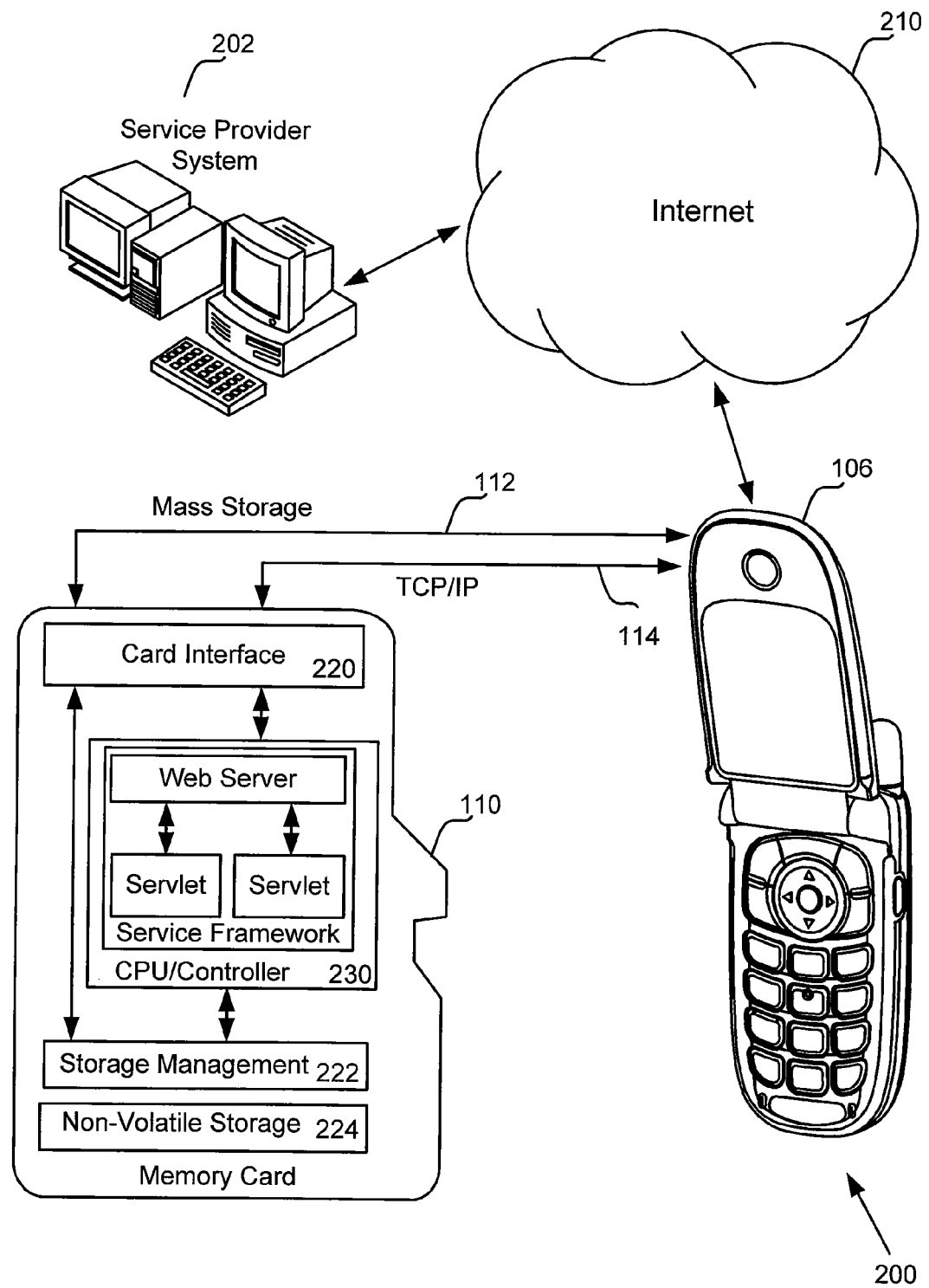
FIG. 2 is a diagram illustrating an exemplary non-volatile storage device capable of controlling access to its stored content.

In one embodiment, limiting content access through binding requires contacting a remote service provider system to receive authorization information to apply when processing content access requests. FIG. 2 is a diagram illustrating an exemplary non-volatile storage device 110 capable of controlling access to its stored content. The non-volatile storage device 110 may include a card interface 220, a controller or central processing unit 230, a storage management controller 222, and non-volatile storage 224.

A non-volatile storage device 110 may contain content accessible by one or more of the card interfaces. As shown in FIG. 2, in one embodiment, the card interfaces may include a mass storage interface 112 and a TCP/IP interface 114. In one embodiment, the mass storage interface is a Secure Digital interface. In another embodiment, the mass storage interface is a network interface. In yet another embodiment, the mass storage interface is a Universal Serial Bus (USB) interface. The non-volatile storage device may receive requests from the host device 106 over the mass storage interface 112 to access content stored in the non-volatile storage 224. The request is received at the card interface 220, and forwarded to the storage management controller 222 for processing. The storage management controller may receive a request from the card interface 220, and may read, write, modify, or erase content in the non-volatile storage 224 in response to the request. In some embodiments, the request to read, write, modify, erase, or otherwise access content in the non-volatile storage 224 using the mass storage interface 112 may be denied because the content or the storage location within the non-volatile storage 224 is protected.

In one embodiment, access to protected content or storage areas in the non-volatile storage 224 may be controlled by the controller or central processing unit 230. As shown in FIG. 2, the controller may implement a service framework including a web server capable of receiving hypertext transfer protocol (HTTP) content access requests over the TCP/IP interface 114, and an application or Java servlet that processes the content access requests. In one embodiment, the web server is compliant with the Open Mobile Alliance (OMA) Smartcard Web Server standard. The non-volatile storage device 110 may share a network address with the host device 106, or may be assigned a network address, such as a TCP/IP address, by the host device 106 or the network. Using the TCP/IP interface 114, the non-volatile storage device 110 may establish a secure communications channel with a service provider system 202 via the host device 106. Such as secure communication channel may occur over a local network or intranet, or over the internet 210 as shown in FIG. 2. A service provider system 202 may include a combination of hardware such as a computers or servers, and software applications, such as database management applications, to facilitate in the establishment of a secure communication channel with a host device, and process authorization requests. In one embodiment, the service provider system 202 includes a service provider server. In one embodiment, the service provider system 202 may be the Mobile Network Operator 102. In another embodiment, the service provider system may be a system associated with a content provider such as a music, video, or other media supplier. The network address of the service provider server 202, used by the non-volatile storage device to initiate a secure communication channel, may be stored in the non-volatile storage 224, or may be obtained from the host device 106.

Once the secure communication channel is established, the controller 220 may transmit an authorization request to the service provider server 202. The authorization request may include identification information, such the identity of the non-volatile storage device 110, the host device 106, or the user of the host device 106. In response, the service provider server 202 may determine a content access authorization that corresponds to the received identification information, and may transmit the authorization to the controller 230 to the controller 220 over the secure communication channel via the host device 106 and over the TCP/IP interface 114. The authorization may be stored in the controller 220 or other volatile storage in the non-volatile storage device 110. The authorization may include permissions to read, write, erase, modify, or otherwise access selected content in the non-volatile storage device 224. In one embodiment, the received authorization may also include an instruction to deny all types of access to the content, such as when a user of the host device has not paid to access content stored in the non-volatile storage device 110.

Obtaining an authorization may be performed in response to a request from the host device 106 to access content stored in the non-volatile storage 224, or may be performed when the non-volatile storage device 110 is powered up or when communication with the host device 106 is first established. Additionally, an authorization may expire after a period of time has elapsed, or after the content or the non-volatile storage 224 has been accessed a predetermined number of times. In this case, the process of obtaining an authorization may be repeated. Repeating the authorization process periodically allows the received authorization to more accurately reflect the current authorization status as reflected in a database or list maintained in the service provider system 202.

The card interface 220 in the non-volatile storage device 110 may receive an access request over TCP/IP protocol interface 114. In one embodiment, the request is a hypertext transfer protocol message sent from the host device 106 and received at the web server. A servlet accesses the previously received authorization and compares it to the access request in order to grant or deny access. For example, if the host device request is to erase the content, and the authorization allows read-only access, the request will be denied. If the request may be granted according to the previously received authorization, the servlet or application may forward the request to the storage management controller 222, which, in turn, may access the non-volatile storage 224 in order to read, write, erase, modify, or otherwise access the content in order to complete the request from the host device.

As shown in FIG. 2, the card interface 220, the controller or central processing unit 230, and the storage management controller 222 may be implemented in circuitry in order to implement the functionality described in the figures and accompanying description. As used herein, "circuitry" can include one or more components and be a pure hardware implementation and/or a combined hardware/software (or firmware) implementation. Accordingly, "circuitry" can take the form of one or more of a microprocessor or processor that executes computer-readable program code (e.g., software or firmware stored in the non-volatile storage 224 (such as, for example, the software routines illustrated in the attached flowcharts)), logic gates, switches, an application specific integrated circuit (ASIC), a programmable logic controller, and an embedded microcontroller, for example.

In some systems, accessing a removable memory device such as a SIM or R-UIM card 108 is required in order to access the network 104, such as to establish a secure communications channel with a service provider system 202, or to transmit an authorization request or receive an authorization. Such network access may require exchanging data or commands with the SIM or R-UIM card 108, or sending network access requests to the SIM or R-UIM card 108, which in turn relays or generates the actual network access requests. Such a system may depend on specialized hardware or software on the host device 106 in order to exchange network access requests and responses between the non-volatile storage device 110 and the SIM or R-UIM card 108. If a host device 106 does not have this requisite hardware or software, then access to the protected storage non-volatile storage device 110 may be prohibited because the non-volatile storage device 110 would be unable communicate with the service provider system 202 in order to obtain an authorization.

However, in one embodiment, the non-volatile storage device may establish a secure communications channel with a service provider system 202 via the host device 106, and without accessing a removable device in communication with the host device 106, such as a SIM or R-UIM card 108. Similarly, the transmission of the authorization request and reception of an authorization from a service provider system 202 may occur without accessing a removable device in communication with the host device 106, such as a SIM or R-UIM card 108. In this embodiment, the host device 106 may facilitate network communication between the service provider system 202 and the non-volatile storage device 110, but may not require specialized hardware or software to transfer commands and data between the non-volatile storage device 110 and the SIM or R-UIM card 108. By reducing or eliminating the involvement of the SIM or R-UIM card 108 from the steps of establishing a secure communication channel and obtaining an authorization, the host device 106 software or hardware may be simplified, and the protected storage within the non-volatile storage device 110 may be accessible from a greater variety of host devices 106.

Figure 3:
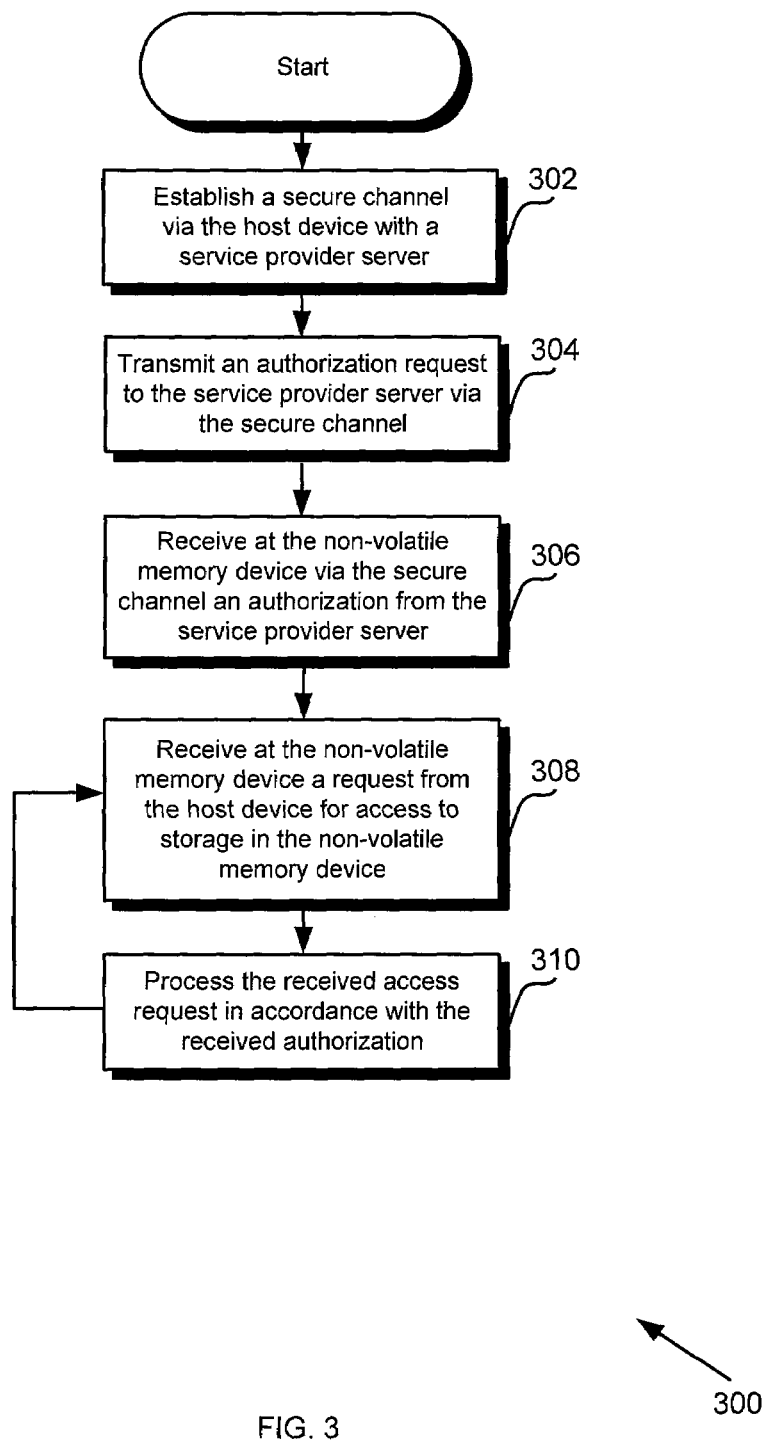
FIG. 3 shows exemplary steps for accessing content stored in the non-volatile storage device of FIG. 2.

FIG. 3 shows exemplary steps 300 for accessing content stored in the non-volatile storage device 110 of FIG. 2. Control begins at step 302, where the secure communication channel is established with a service provider system via a host device. In one embodiment, the non-volatile storage device 110 initiates the establishment of a secure communication channel when power is applied to it, such as when the non-volatile storage device 110 is inserted into a card receptacle or card slot of a cellular telephone 106. Similarly, a communications channel may be established when the non-volatile storage device 110 establishes communications with the host device 106, such as a cellular telephone 106, which is capable of accessing a network such as the internet 210. The secure communication channel may utilize the TCP/IP communication protocols to communicate with a service provider system 202 over a network such as the internet 210. In one embodiment, the service provider is the Mobile Network Operator. In another embodiment, the service provider may be content provider or another entity other than the Mobile Network operator. As previously explained, the service provider system may include hardware, such as a server, and software for receiving and processing authorization requests. In one embodiment, the secure channel bypasses the SIM card 208. By bypassing the SIM card 208, the host device 106 does not access the SIM card 208, such as to send or receive data or identification values, or to send commands or receive results, in order to establish or operate the secure communication channel.

A secure communication channel may protect the data, commands, or results transmitted between the non-volatile storage device 110 and the service provider system 202 from access by unauthorized parties. In one embodiment, a secure communication channel may utilize methods such as data encryption and decryption, where some or all of the transmission content is encrypted by the service provider system 202 before transmission, and decrypted by the non-volatile storage device 110 after reception. Similarly, the non-volatile storage device 110 encrypts commands, data, or results before transmission to the service provider system 202, and the service provider system 202 may decrypt the encrypted commands, data, or results once received. Establishment of a secure communication channel may include the exchange of information between the non-volatile storage device 110 and the service provider system 202 necessary to complete mutual authentication and establish the encryption and decryption keys to be utilized when encrypting commands, data, or results before transmission and decrypting the received encrypted commands, data, or results.

Control passes to step 304, where the non-volatile storage device 110 transmits an authorization request to the service provider system 202 via the secure communication channel. The authorization request may include information that allows the service provider system 202 to identify the non-volatile storage device 110, the host device 106, or the customer. For example, the non-volatile storage device 110 may store an identification value transmitted as part of the authorization request. In another example, the authorization request may include a value that indentifies the host device 106. If the host device is a cellular telephone 106, the value may be an International Mobile Equipment Identity (IMEI) value that is transmitted to the non-volatile storage device 110, such as when communications are first established between the cellular telephone 106 and the non-volatile storage device 110. If the host device is a personal computer, a Media Access Control (MAC) address assigned to the network hardware in the personal computer may be utilized to identify the host device. The identity of the service user, customer, or subscriber may be determined using information assigned to the user, customer, or subscriber when connecting to a network used to access the service provider server, such as the internet or an intranet. For example, an identification value indicative of a customer may include a network address, such as an IP network address, associated with the host device 106. Such a network address may be assigned to the cellular telephone 106 by the Mobile Network Operator (MNO) when the device is connected to the network 104, in order to facilitate communication with the internet 210. In another embodiment, the host device is a personal computer, and the network address is assigned to the host device by an internet service provider (ISP) when accessing the internet 210. As previously stated, in one embodiment, the secure channel bypasses the SIM card 108. Thus, the host device 106 does not access the SIM card 208, such as to send or receive data or identification values, or to send commands or receive results, in order to create or transmit the authorization request to the service provider system 202.

Control passes to step 306, where the non-volatile storage device receives an authorization from the service provider server 202. The authorization may include a permission to access the content, such as a read permission, a write permission, or an erase permission. In one embodiment, the received authorization may simply be a denial of any access rights. In other words, the authorization may acknowledge that a request was received at the service provider server 202 in step 304, but may deny any access to the content stored in the non-volatile storage device 110.

The service provider server may utilize the identification information in the authorization request to determine an authorization to provide to the non-volatile storage device 110. For example, a content provider may distribute a non-volatile storage device with content accessible for a trial period of 30 days. The service provider system 202 may receive an authorization request from the non-volatile storage device 110. If the non-volatile storage device 110 was not previously accessed, the service provider system 202 may store the card identification value in a database of previously activated cards. When subsequent authorization requests are received, the service provider system 202 may determine of the non-volatile storage device was first authorized more than 30 days ago, and if so, deny access to the content stored in the card.

In another example, a service provider subscriber or service provider customer, such as a Mobile Network Operator subscriber, may pay for access to movies, music, or other types content available on non-volatile storage devices 110 distributed by one or more content providers. The subscriber or customer may obtain a non-volatile storage device 110 containing content covered under the access subscription, or may download or otherwise store that content to a non-volatile storage device 110. The non-volatile storage device 110 may then transmit a value indicative of the user's or customer's or subscriber's identity when sending an authorization request to the service provider server 202. In one embodiment, the value may be the network address assigned to the cellular telephone 106 by the Mobile Network Operator 102. In another embodiment, the value may be the network address assigned to the host device 106, such as a personal computer or PDA, such as by an internet service provider. The identification value may also be any value the stored in the non-volatile storage device 110 or accessible to the non-volatile storage device 110 that may uniquely identify the non-volatile storage device 110 or the user of the non-volatile storage device 110. Other identification values are possible, including credentials provided by the content provider when subscribing to or purchasing access to the content. In response to receiving the request, the service provider server may compare the identification value received with a database or list of subscribers to or customers that purchased that particular piece of content or that type of content (such as action movies, music, etc.) or to a list of subscribers or purchasers of content from a particular provider. If the request originates from a subscriber or customer that is not authorized to access that particular content, access to the content will be denied.

In another example, a user, such as a Mobile Network Operator subscriber, may receive access to movies, music, or other types content available on non-volatile storage devices 110 distributed by one or more content providers for a period of time. The subscriber or customer may obtain a non-volatile storage device 110 containing content or may download or otherwise store that content to a non-volatile storage device 110. The non-volatile storage device 110 may then transmit a value indicative of the user identity when sending an authorization request to the service provider server 202. The identification value may be similar to the subscriber or customer identification information described above, such as network addresses, MNO-specific user values, or credentials provided by the content provider in order to access the content. In response to receiving the request, the service provider server may compare the identification value received with a database or list of users authorized to access that particular piece of content or that type of content (such as action movies, music, etc.) or to a list of users authorized to access content from a particular provider. If the request originates from a user that is not authorized to access that particular content, access to the content will be denied. In one embodiment, a free user trial period could be created by adding a user's identification to a database or list when the content is first accessed, then authorizing access for a trial period, and denying authorization thereafter.

In yet another example, a host device such as a cellular telephone 106 is associated with a unique identifier called an International Mobile Equipment Identity (IMEI) value. The IMEI value, when transmitted as part of the service request, may allow a service provider server to determine a particular host device is capable of accessing content stored on a non-volatile storage device 110. For example, some cellular telephones may lack the processing capability to decode and display video at a performance rate acceptable to a customer. Other cellular telephones may lack a software codec required to decode certain types of content, such as MPEG-4 AVC/H.264 video. In this case, the IMEI value received as part of the authorization request may be utilized by the service provider server to determine whether a device is capable of decoding or accessing the content. If the host device is a personal computer or PDA, other identification information, such as the central processing unit model, system software, or other capabilities of the device to access content, may be transmitted to the service provider server 202 in order to allow the service provider server 202 to determine whether the content may be successfully accessed using the hardware and/or software capabilities of the host device 106.

In another example, the IMEI value is stored in a database of host devices authorized by the service provider to access content. A subscriber may pay to access content using a finite number (such as three) of host devices. The non-volatile storage device may identify these host devices 106 to the service provider by transmitting an identification value such as an IMEI value, or in the case of a personal computer, a value such as a Media Access Control (MAC) address. The service provider may store these identification values in a database, and compare the identification value received with an authorization request with the host device identification values stored in the database. If the request originates from a host device 106 that is not authorized to access that particular content, access to the content will be denied.

Once an authorization is received by the non-volatile storage device 110, the authorization may be utilized to process content access requests from the host device 106. Control passes to step 308, where the non-volatile storage device 110 receives a request from the host device 106 for access to content stored in the non-volatile storage device 110. In one embodiment, the access request is hypertext transfer protocol (HTTP) request received through the card interface 220 at a web server running on the controller or central processing unit 230 in the non-volatile storage device 110, and is processed by an application or Java servlet executing on the web server.

Control passes to step 310, where the non-volatile storage device 110 processes the received request in accordance with the received authorization. For example, if an authorization was received to allow only read access to the content, the non-volatile storage device 110 will deny a write or erase access request. If the access request is a read access and read access is authorized, access to the content will be granted. Control then returns to step 308 to process additional requests as received at the non-volatile storage device 110. While the steps 300 are shown with respect to a single content access server and a single authorization, in other embodiments, the non-volatile storage device 110 may establish secure communication channels with multiple content access servers, and may retrieve and utilize several authorizations to access content stored on the card. For example, the non-volatile storage device 110 may contact a service provider server of a music content provider in order to obtain an authorization for processing requests to access music content on the card. The non-volatile storage device may also establish a secure communication channel with a service provider server of a video content provider in order to obtain an authorization for processing requests to access video content on the card.

The steps 302, 304, 306 may be repeated when the non-volatile storage device is disconnected from a power source, then reconnected to a power source, such as when a memory card is removed from and reinserted to a cellular telephone 106, or when the cellular telephone 106 is power cycled. The steps 302, 304, 306 may also be repeated when the non-volatile storage device 110 comes into communication with another host device, such as when a memory card is removed from a cellular telephone and inserted into another host device. In another embodiment, the steps 302, 304, 306 may be repeated on a periodic basis, such as to obtain a current authorization to apply to new content access requests.

Therefore, digital content management is achieved with limited use of specialized content applications running on the host device, and when the host is a cellular telephone, without the use of specialized services or applications running on a SIM or an R-UIM card 108. A non-volatile storage device initiates the creation of a secure communication channel with a service provider server, and obtains a content authorization. The host device facilitates the establishment of a secure communication channel, but otherwise may be uninvolved in the process of obtaining an authorization. Thus, little or no special host device software may be required. Because this binding method does not make use of the SIM card, such as to bind the content to the SIM card based on its IMSI value, the SIM card may be bypassed when creating the secure communication channel or obtaining the authorization. The authorization may be based on identification information transmitted by the non-volatile storage device to the service provider system over the secure communication channel. The identification information may identify the non-volatile storage device, the host device, or the subscriber to the service provider server. The service provider server, in turn, may use the identification information to determine the type of authorization (if any) to send to the non-volatile storage device. The non-volatile storage device processes requests received from the host device to access the content. In one embodiment, access requests are received over an HTTP protocol at web server running on a controller or CPU in the non-volatile storage device. The use of a standard protocol to request and receive access from the non-volatile storage device also limits the use of specialized host device software to access content. Further, a service provider system 202 may change the authorization request process by changing the steps 300 performed by the non-volatile storage device 110, instead of deploying software changes to all of the host devices that may request access to content stored on the non-volatile storage device 110. By limiting or eliminating the need for specialized content access applications, a consumer may be able to access media on a storage device such as a memory card using an increased number of host devices.

Although the invention has been described with respect to various system and method embodiments, it will be understood that the invention is entitled to protection within the full scope of the appended claims and is not limited to the aforementioned exemplary embodiments.

The invention claimed is:

1. A method for managing access to data in a non-volatile storage device, the method comprising:
   in a non-volatile storage device which is in communication with a host device associated with a service provider customer:
   establishing a secure communication channel with a service provider system via the host device over a network, the secure communication channel established without accessing a removable device associated with the host, wherein the removable device is known to the service provider system, the service provider system comprises a Mobile Network Operator server, and the service provider customer comprises a Mobile Network Operator subscriber;
   transmitting an authorization request to the service provider system over the network via the secure communication channel, wherein transmitting the authorization request comprises the non-volatile storage device transmitting a value indicative of an identity of the Mobile Network Operator subscriber;
   receiving at the non-volatile storage device via the secure communication channel an authorization from the service provider system, the received authorization corresponding to the identity of the Mobile Network Operator subscriber;
   receiving at the non-volatile storage device a request from the host device for access to storage in the non-volatile storage device; and
   processing the received access request in accordance with the received authorization.

2. The method of claim 1, wherein the host device comprises a cellular telephone, and wherein transmitting the authorization request comprises transmitting an International Mobile Equipment Identity (IMEI) value.

3. The method of claim 1, wherein transmitting the authorization request comprises transmitting the authorization request via a network address corresponding to an identity of the host device.

4. The method of claim 1, wherein transmitting the authorization request comprises transmitting an identification value stored in the non-volatile storage device, wherein the identification value comprises a value uniquely associated with the non-volatile storage device.

5. The method of claim 1, wherein the host device is in communication with a Subscriber Identity Module card.

6. A method for managing access to data, the method comprising:
   in a non-volatile storage device which is in communication with a host device associated with a service provider subscriber:
   establishing a secure communication channel via the host device with a service provider system, the secure communication channel established without accessing a Subscriber Identity Module card in communication with the host device, the service provider system comprises a Mobile Network Operator server, and the service provider customer comprises a Mobile Network Operator subscriber;
   transmitting an authorization request to the service provider system via the secure communication channel, wherein transmitting the authorization request comprises the non-volatile storage device transmitting a value indicative of an identity of the Mobile Network Operator subscriber;
   receiving at the non-volatile storage device via the secure communication channel an authorization from the service provider system, the received authorization corresponding to the identity of the Mobile Network Operator subscriber;
   receiving at the non-volatile storage device a request from the host device for access to storage in the non-volatile storage device; and
   processing the received access request in accordance with the received authorization.

7. The method of claim 6, wherein the host device comprises a cellular telephone, and wherein transmitting the authorization request comprises transmitting an International Mobile Equipment Identity (IMEI) value.

8. The method of claim 6, wherein transmitting the authorization request comprises transmitting the authorization request via a network address corresponding to an identity of the host device.

9. The method of claim 6, wherein transmitting the authorization request comprises transmitting an identification value stored in the non-volatile storage device, wherein the identification value comprises a value uniquely associated with the non-volatile storage device.

10. A non-volatile storage device, comprising:
    a non-volatile memory; and
    a controller in communication with the non-volatile memory, the controller configured to place the non-volatile storage device in communication with a host device comprising a Subscriber Identity Module card; and wherein the controller is further configured to:
- establish a secure communication channel with a service provider system via the host device without accessing the Subscriber Identity Module card;
- transmit an authorization request to the service provider system via the secure communication channel including an identity of a service provider subscriber;
- receive from the service provider system via the secure communication channel an authorization corresponding to an identity of the service provider subscriber, wherein the service provider system comprises a Mobile Network Operator server, and the service provider subscriber comprises a Mobile Network Operator subscriber;
- receive a request from the host device for access to the non-volatile memory; and
- process the received access request in accordance with the received authorization.

11. The non-volatile storage device of claim 10, wherein the host device comprises a cellular telephone, and wherein the authorization request comprises an International Mobile Equipment Identity (IMEI) value.

12. The non-volatile storage device of claim 10, wherein the controller configured to transmit the authorization request comprises circuitry configured to transmit the authorization request via a network address corresponding to the identity of the host device.

13. The non-volatile storage device of claim 10, wherein the authorization request comprises an identification value stored in the non-volatile storage device, wherein the identification value comprises a value uniquely associated with the non-volatile storage device.

14. The non-volatile storage device of claim 10, wherein the non-volatile storage device comprises a removable media card.

* * * * *